(12) United States Patent
Majumder

(10) Patent No.: US 9,762,066 B2
(45) Date of Patent: Sep. 12, 2017

(54) CONTROL OF ENERGY STORAGES IN A MICROGRID

(71) Applicant: ABB Schweiz AG, Baden (CH)

(72) Inventor: Ritwik Majumder, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/129,304

(22) PCT Filed: Mar. 24, 2014

(86) PCT No.: PCT/EP2014/055806
§ 371 (c)(1),
(2) Date: Sep. 26, 2016

(87) PCT Pub. No.: WO2015/144194
PCT Pub. Date: Oct. 1, 2015

(65) Prior Publication Data
US 2017/0117713 A1   Apr. 27, 2017

(51) Int. Cl.
*H02J 3/28* (2006.01)
*H02J 3/32* (2006.01)
(Continued)

(52) U.S. Cl.
CPC .............. *H02J 4/00* (2013.01); *H02J 7/0068* (2013.01); *H02J 13/00* (2013.01)

(58) Field of Classification Search
CPC .... H02J 3/28; H02J 3/381; H02J 13/00; H02J 3/32; H02J 4/00; H02J 7/0068; Y02P 80/14
(Continued)

(56) References Cited

U.S. PATENT DOCUMENTS 8,676,393 B1 * 3/2014 Hupton ............... H02J 3/14
307/24
2008/0269953 A1 * 10/2008 Steels ............... H02J 7/0004
700/295

FOREIGN PATENT DOCUMENTS

EP          2416464 A2    2/2012
KR      101375812 B1    3/2014
(Continued)

OTHER PUBLICATIONS

T. Logenthiran, Multi-Agent System (MAS) for Short-Term Generation Scheduling of a Microgrid, Dec. 6-9, 2010, IEEE ICSET 2010.*
(Continued)

*Primary Examiner* — Rexford Barnie
*Assistant Examiner* — Thai Tran
(74) *Attorney, Agent, or Firm* — Whitmyer IP Group LLC

(57) ABSTRACT

A method performed by a first control unit for controlling a first energy storage in a microgrid. The method includes calculating a first storage capability parameter for the first energy storage; transmitting capability information about the first storage capability parameter to a second control unit configured for controlling a second energy storage in the microgrid; receiving capability information about a second storage capability parameter for the second energy storage from the second control unit; calculating a first power sharing ratio for the first energy storage, based on the first and second storage capabilities; and sending control signals including information based on the calculated first power sharing ratio, for controlling the first energy storage to inject an amount of power (P) into the microgrid in accordance with the first power sharing ratio for correcting an observed deviation ($\Delta f$, $\Delta V$) in the microgrid.

13 Claims, 6 Drawing Sheets

(51) Int. Cl.
  *H02J 4/00* (2006.01)
  *H02J 7/00* (2006.01)
  *H02J 13/00* (2006.01)

(58) Field of Classification Search
  USPC .................... 700/295; 307/18–20, 24, 48, 55
  See application file for complete search history.

(56) References Cited

FOREIGN PATENT DOCUMENTS

| WO | 2013005875 A1 | 1/2013 |
|----|---------------|--------|
| WO | 2013013267 A1 | 1/2013 |

OTHER PUBLICATIONS

He M M et al: "An Architecture for Local Energy Generation, Distribution, and Sharing", Energy 2030 Conference, 2008. Energy 2008. IEEE, IEEE, Piscataway, NJ, USA, Nov. 17, 2008 (Nov. 17, 2008), pp. 1-6.

International Preliminary Report on Patentability Application No. PCT/EP2014/055806 Completed: Jun. 16, 2016 6 pages.

International Search Report & Written Opinion of the International Searching Authority Application No. PCT/EP2014/055806 Completed: Nov. 25, 2014;Mailing Date:Dec. 4, 2014 14 pages.

Written Opinion of the International Preliminary Examining Authority Application No. PCT/EP2014/055806 Mailing Date: Feb. 29, 2016 5 pages.

\* cited by examiner

Storage 1 is deactivated from coordinated sharing scheme and bought down to 20%

CONTROL OF ENERGY STORAGES IN A MICROGRID

TECHNICAL FIELD

The present disclosure relates to a method of a control unit for controlling an energy storage in a microgrid, as well as to such a control unit.

BACKGROUND

A microgrid is a localized grouping of electricity generation, energy storage, and loads that normally operates connected to a traditional centralized grid via a point of common coupling. Microgrids are part of the structure for so called distributed generation aiming at producing electrical power locally from many small energy sources which may be called distributed generators (DG:s) or micro sources.

In a microgrid, system stability is improved with application of energy storage for continuous real and reactive power injection that works as a stabilizer for the microgrid. The main control philosophy for such stabilizer is real and reactive power injection based on local frequency and voltage deviation, respectively. In most scenarios, a larger storage/stabilizer is economical. However, in a microgrid, depending on growth, expansion and with higher penetration of DGs, it may be required to add a new storage/stabilizer in an existing microgrid and that leads to scenarios with multiple stabilizers in the same microgrid. Moreover, a planned multiple stabilizer scenario can also be beneficial for a microgrid with critical loads and frequency dependencies. This scenario is also realistic considering the DG participation in system damping.

For improved power quality, the energy storages should act fast but they always do have limits due to rating and energy left at time when needed. The charging and discharging rate of any particular storage unit is also limited. A drawback is that a high rate of discharge (or charge) of stored energy may cause tripping leading to power imbalance and stability problems. With multiple storages in a microgrid, thus one of the key objectives would be to share the power injection among the storages appropriately.

Control of multiple energy storages in a microgrid is generally known, e.g. WO 2013/005875 discloses a coordination control system for a microgrid having a first energy storage which can ouput a state of charge value to a central control device, and a second energy storage for controlling an output based on a command from the central control device.

SUMMARY

It is an objective of the present invention to improve the stability of a microgrid having a plurality of energy storages, by means of a novel control mechanism for controlling at least one of the energy storages.

According to an aspect of the present invention, there is provided a method performed by a first control unit for controlling a first energy storage in a microgrid. The method comprises calculating a first storage capability parameter for the first energy storage. The method also comprises transmitting capability information about the first storage capability parameter to at least a second control unit configured for controlling a second energy storage in the microgrid. The method also comprises receiving capability information about a second storage capability parameter for the second energy storage from the second control unit. The method also comprises calculating a first power sharing ratio for the first energy storage, based on the first and second storage capabilities. The method also comprises sending control signals comprising information based on the calculated first power sharing ratio, for controlling said first energy storage to inject an amount of power into the microgrid in accordance with the first power sharing ratio for correcting an observed deviation (e.g. frequency and/or voltage deviation from reference value) in the microgrid.

According to another aspect of the present invention, there is provided a first control unit for controlling a first energy storage in a microgrid. The first control unit comprises processor circuitry, and a data storage unit storing instructions executable by said processor circuitry whereby said control unit is operative to calculate a first storage capability parameter for the first energy storage. The first control unit is also operative to transmit capability information about the first storage capability parameter to at least a second control unit configured for controlling a second energy storage in the microgrid. The first control unit is also operative to receive capability information about a second storage capability parameter for the second energy storage from the second control unit. The first control unit is also operative to calculate a first power sharing ratio for the first energy storage, based on the first and second storage capabilities. The first control unit is also operative to send control signals comprising information based on the calculated first power sharing ratio, for controlling said first energy storage to inject an amount of power into the microgrid in accordance with the first power sharing ratio for correcting an observed deviation in the microgrid.

According to another aspect of the present invention, there is provided an energy storage for a microgrid. The energy storage comprises an energy storing device, e.g. a battery or a flywheel, and a storage controller comprising an embodiment of the first control unit of the present invention.

According to another aspect of the present invention, there is provided a microgrid comprising at least one DG, and a plurality of energy storages each comprising an embodiment of the control unit of the present invention.

According to another aspect of the present invention, there is provided a computer program product comprising computer-executable components for causing a control unit to perform an embodiment of the method of the present invention when the computer-executable components are run on processor circuitry comprised in the control unit.

According to another aspect of the present invention, there is provided a computer program comprising computer program code which is able to, when run on processor circuitry of a control unit, cause the control unit to calculate a first storage capability parameter for a first energy storage in a microgrid. The code is also able to cause the control unit to transmit capability information about the first storage capability parameter to at least a second control unit configured for controlling a second energy storage in the microgrid. The code is also able to cause the control unit to receive capability information about a second storage capability parameter for the second energy storage from the second control unit. The code is also able to cause the control unit to calculate a first power sharing ratio for the first energy storage, based on the first and second storage capabilities. The code is also able to cause the control unit to send control signals comprising information based on the calculated first power sharing ratio, for controlling said first energy storage to inject an amount of power into the microgrid in accordance with the first power sharing ratio for correcting an observed deviation in the microgrid.

According to another aspect of the present invention, there is provided a computer program product comprising an embodiment of the computer program of the present invention, and a computer readable means on which the computer program is stored.

By transmitting the storage capability parameter of the first energy storage to the second control unit and receiving a, typically corresponding, storage capability parameter of the second energy storage from said second control unit, the first control unit is able to locally calculate the power sharing ratio for the first storage unit, without the need for a central control unit. Each of the energy storages is associated with its own control unit, e.g. positioned locally with its storage unit such as integrated in its storage control. The storage capability parameters may e.g. be broadcasted from each of the (or all participating) control units of respective energy storages to all of the other control units in the microgrid which are participating in power sharing.

The decentralised coordinated control in accordance with the present invention may provide more economic and stable system operation, as well as flexibility in allowing adding or removing of energy storages of the microgrid.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
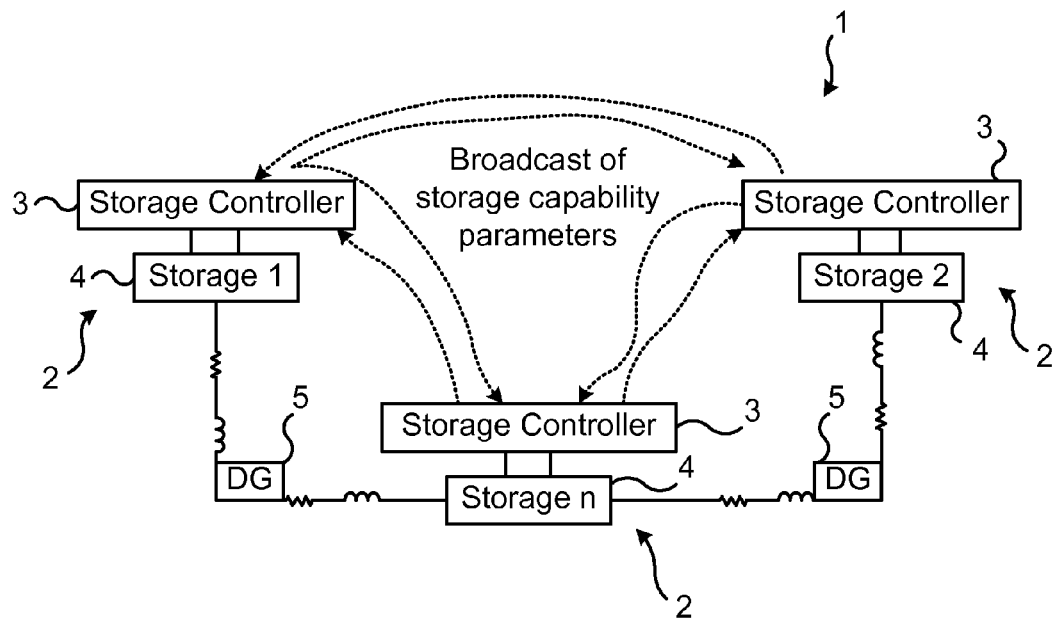
FIG. 1 is a schematic circuit diagram of an embodiment of a microgrid in accordance with the present invention.

FIG. 1 illustrates an embodiment of a microgrid 1 comprising a plurality of distributed generators (DG) 5 as well as a plurality of energy storages 2 each comprising an energy storing device 4, e.g. a battery or flywheel, and a local storage controller 3 for controlling the charging/discharging of power of the energy storing device 4, e.g. injection of power into the microgrid. In accordance with the present invention, the storage controllers 3 can communicate with each other, e.g. via radio or wired signalling (possibly broadcasted), to exchange storage capability parameters of the respective energy storages 2 with each other, for enabling control of the storages 2 in a decentralized manner without the need for a central control unit.

Figure 2:
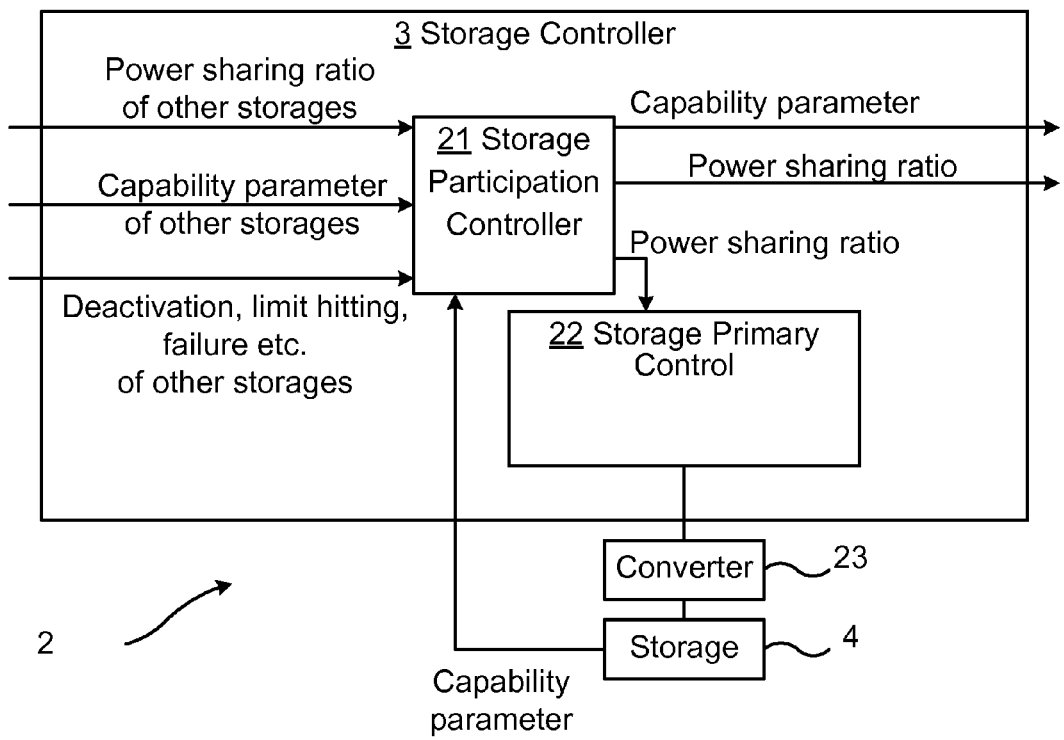
FIG. 2 is a schematic block diagram of a storage controller comprising an embodiment of a control unit in accordance with the present invention.

FIG. 2 illustrates an embodiment of an energy storage 2 comprising a storage controller 3, which is configured for controlling an energy storing device 4 by means of a converter 23, also forming part of the energy storage 2, via which the energy storing device 4 is connected in the microgrid 1. The storage controller 3 comprises a regular control module, herein called the storage primary control 22, as well as a control unit 21, herein called the storage participation controller, in accordance with the present invention. In accordance with the present invention, the participation controller 21 governs the participation of the energy storage 2 in power sharing with other energy storages in the microgrid. The participation controller 21 obtains one or more capability parameters of the energy storing device 4, e.g. available energy stored (energy state), power rating, current limit, and/or charge/discharge rate limit. The frequency of e.g. energy state sampling may be in the range of every 1-10 minutes, which is much slower than the control loops in the primary controller. The parameters may also or alternatively relate to other parts of the energy storage 2 than the energy storing device 4, e.g. power rating etc. of the converter (e.g. a voltage sourced converter, VSC). It stores these parameters and transmits it to one or more other participation controllers of other energy storages in the microgrid 1. The same procedure is followed by the other energy storages, whereby the participation controller 21 also receives corresponding capability parameter(s) from the other participation controllers. Based on the capability parameters of its own storage as well as the parameters received from the other storages participating in the power sharing, the participation controller 21 calculates a power sharing ratio, e.g. how much (e.g. percentage) of the total amount of power which needs to be injected into the microgrid for stabilizing it should be injected by its own storage 2. Based on this ratio, the participation controller 21 sends control signals to the primary control 22 which then executes the control of switches in the converter 23 for injecting the proper amount of power from the energy storing device 4. For instance, the participation controller 21 may use the power sharing ratio for calculating a gain which is sent with the control signals to the primary control 22. In some embodiments of the present invention, the participation controller 21 transmits also the power sharing ratio to the other energy storages participating in the power sharing, and thus also receive the corresponding power sharing ratios calculated by the other participation controllers. This may have the advantage of allowing each of the participation controllers to check its calculations with the calculations of the other participation controllers. In some embodiments of the present invention, the participation controller may also receive information about failures etc. of other energy storages 2, typically from the failed energy storage's participation controllers or from another element in the microgrid 1. Such a failure message may e.g. inform the participation controller that the failed energy storage is no longer able to participate in the power sharing, or is only able to participate to a specified degree. The participation controller 21 may then account for this when calculating its power sharing ratio.

Figure 3:
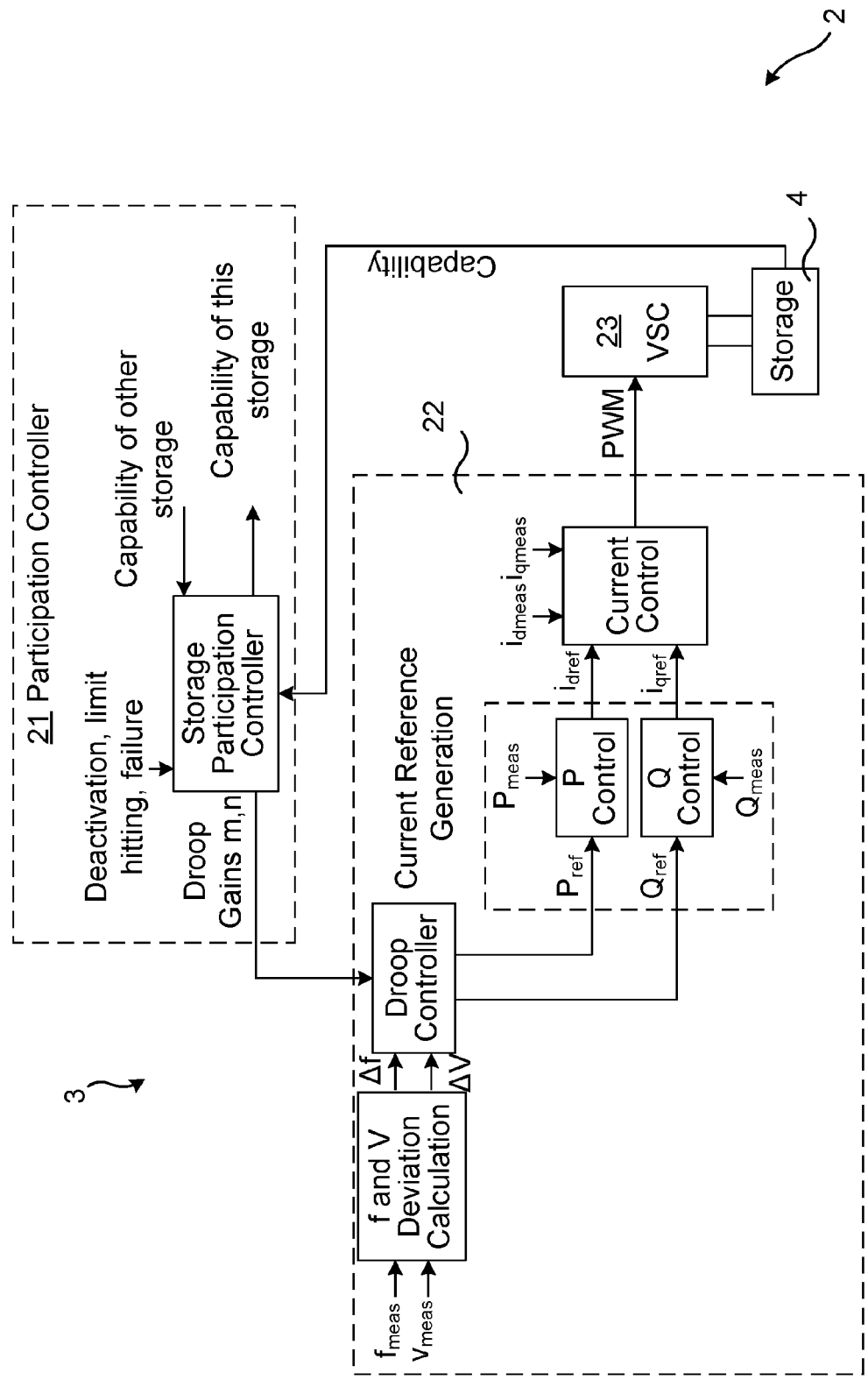
FIG. 3 is a more detailed schematic block diagram of a storage controller comprising an embodiment of a control unit in accordance with the present invention.

FIG. 3 illustrates another embodiment of an energy storage 2, in which an embodiment of the primary control 22 is shown in more detail. The participation controller 21 is as described in relation to FIG. 2, and calculates droop gains, denoted m for the calculation of the real (also called active) power reference $P_{ref}$ and n for the calculation of the reactive power reference $Q_{ref}$, which are sent to a droop controller of the primary controller 22 as information in the control signals. The frequency $f_{meas}$ and the voltage $V_{meas}$ are measured at a point in the microgrid 1 which is close to the point at which the energy storage 2 is configured to inject current in the microgrid. These measured values are compared to reference setpoint values to obtain the deviations $\Delta f$ and $\Delta V$. Based on these deviations and the gains m and n received from the participation controller, the power references $P_{ref}$ and $Q_{ref}$ are calculated, e.g. as $P_{ref} = m \times \Delta f$ and $Q_{ref} = n \times \Delta V$, see also FIGS. 4 and 5. In a current reference generation module in the primary control 22, the power references are compared with corresponding measured power injection values of the energy storage, $P_{meas}$ and $Q_{meas}$, to calculate the real power current reference $i_{dref}$ and the reactive power current reference $i_{qref}$ (the d and q designations for the d and q axes used in control). The current references are then, in a current control module in the primary control 22, compared with the corresponding measured injected currents $i_{dmeas}$ and $i_{qmeas}$ to produce pulse-width modulation (PWD) control signals to the VSC 23 for controlling the current injected into the microgrid 1 from the energy storing device 4.

Figure 4:
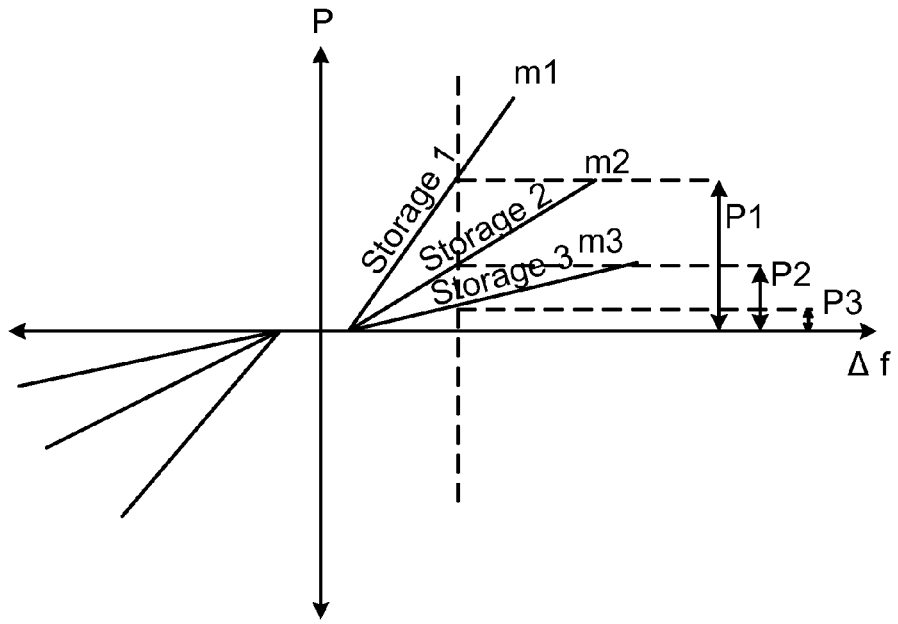
FIG. 4 is a schematic graph illustrating an embodiment of power sharing among energy storages based on gains for a frequency deviation in accordance with the present invention.

FIG. 4 illustrates how the active power references P1, P2 and P3 may be calculated for three energy storages (storage 1, storage 2 and storage 3) participating in power sharing for injecting the total active power P=P1+P2+P3 into the microgrid based on the calculated frequency deviation $\Delta f$ and the calculated respective gains m1, m2 and m3 of the three energy storages. m1:m2:m3 are proportional to P1:P2:P3 in accordance with the embodiment of FIG. 4. The slope of the droop is the gain of the feed-back control loop and can be selected (within stability limit) based on energy left in the storage, power rating, or any other constraint. However, it should be noted that the gains need not be linear. Gains of some storages may e.g. be exponential or stair-shaped.

Figure 5:
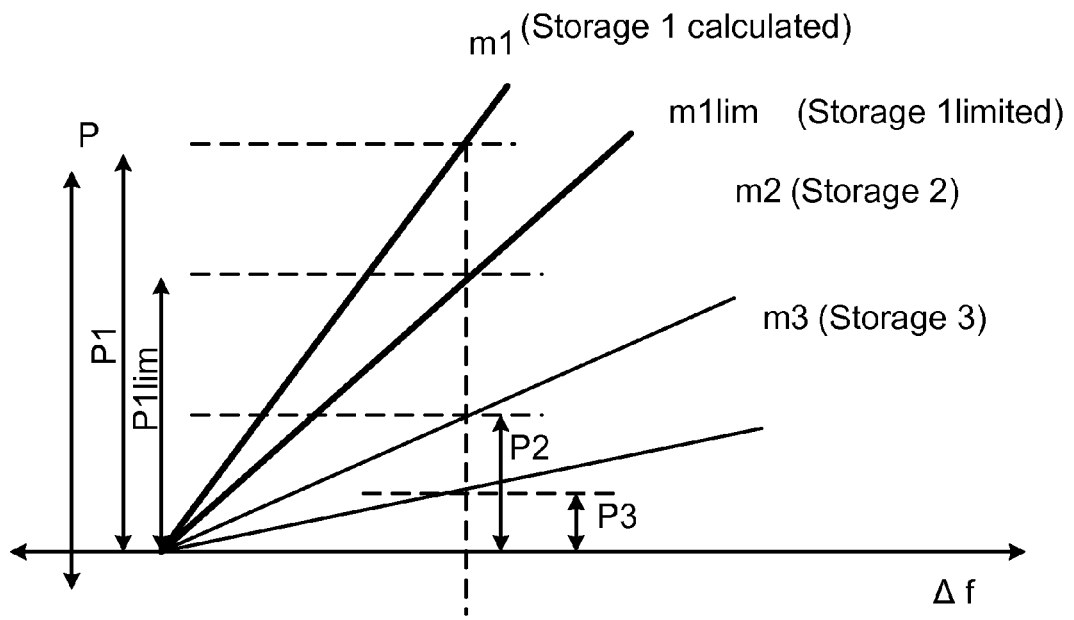
FIG. 5 is a schematic graph illustrating another embodiment of power sharing among energy storages based on gains for a frequency deviation in accordance with the present invention.

FIG. 5 illustrates a similar situation as in FIG. 4, but with a power limit P1lim put on the first energy storage (storage 1). The active power references are then calculated as P=P1lim+P2+P3 where the power references P2 and P3 of the two other energy storages (storage 2 and storage 3) are increased in accordance with their respective gain m2 and m3 limited power of storage 1.

Figure 6:
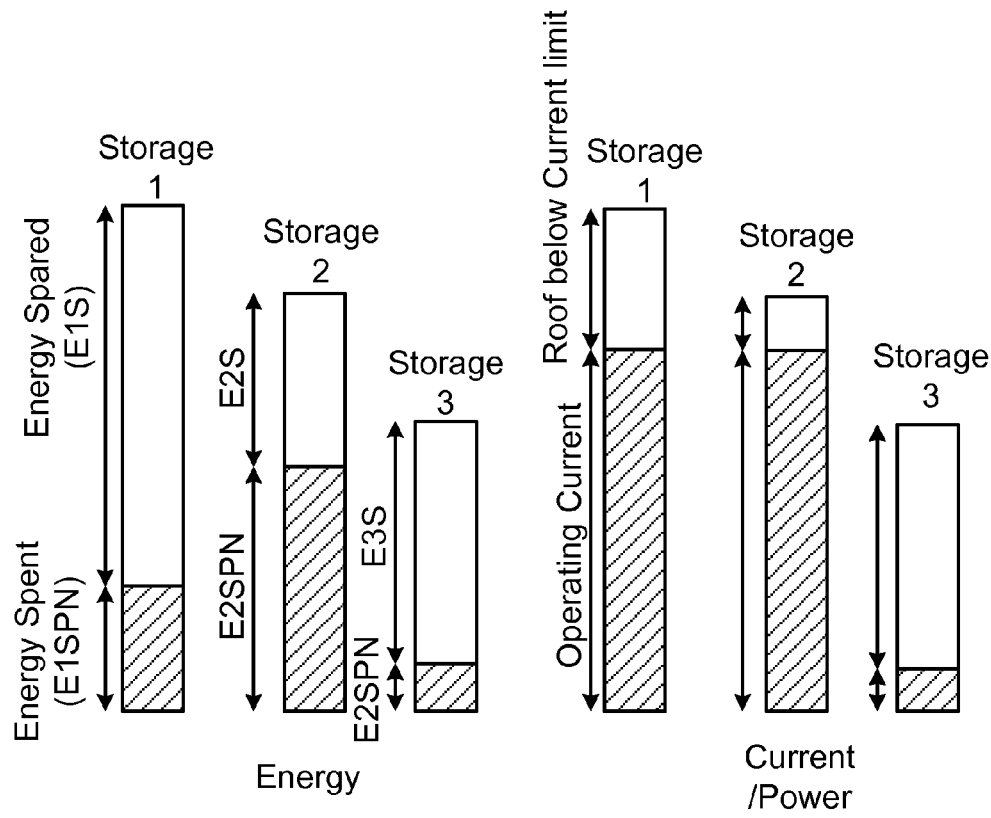
FIG. 6 is a schematic bar graph illustrating different examples of storage capability parameters of different energy storages.

FIG. 6 illustrates a situation with three energy storages (storage 1, storage 2 and storage 3) where storage 1 has a lot of spare stored energy which is available for injection into the microgrid, but it is relatively close to its current limit which means that it cannot much increase its injected current. Thus, if the current sharing ratio is based on the available stored energy in each storage, then storage 1 may hit its current limit, e.g. report this as a fault or such to the other energy storages which will have to compensate. For instance, the smaller storage 3 is far away from its current limit and is thus able to increase its current output to compensate.

Figure 7:
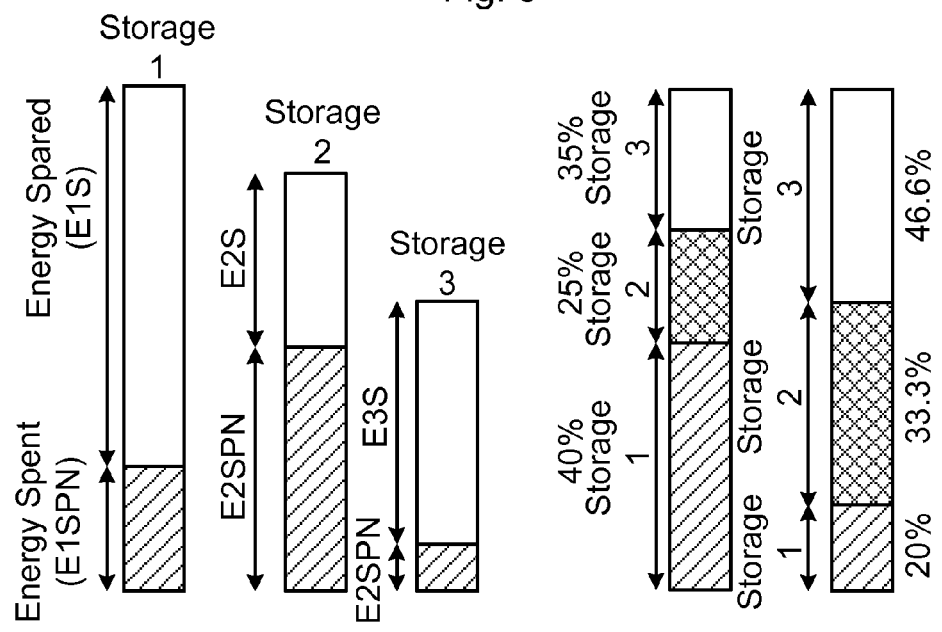
FIG. 7 is another schematic bar graph illustrating different examples of storage capability parameters of different energy storages.

FIG. 7 illustrates a situation with the three storages of FIG. 6 where storage 1 is limited in its participation in the power sharing and brought to a fixed power sharing ratio of 20%. Also this may be reported to the other participation controllers as a fault or similar. The power sharing ratios of the other energy storages are adjusted to compensate. In some cases, a storage may be deactivated completely, and the remaining energy storages are informed and compensate. These ratio calculations may also/alternatively be based on different priorities, such as for supplying power to a critical load, a sensitive grid location etc.

Figure 8:
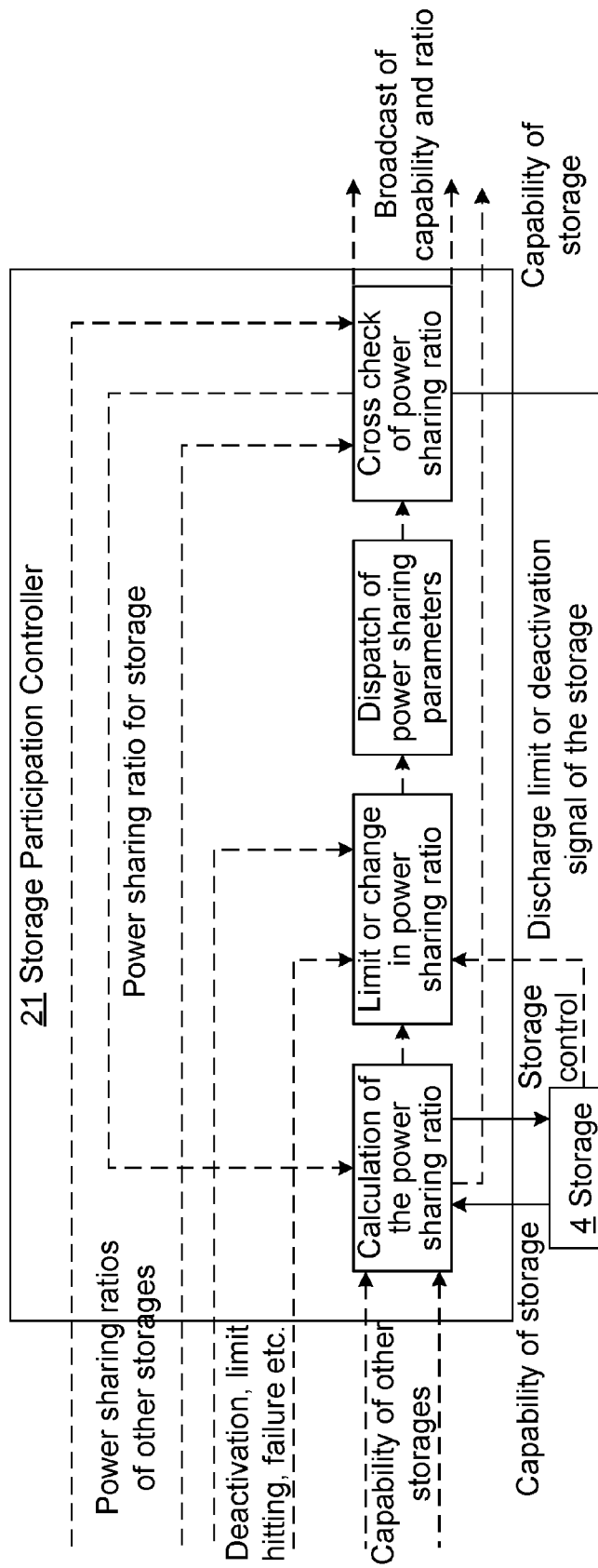
FIG. 8 is a schematic functional block diagram of an embodiment of the control unit of the present invention.

FIG. 8 is a functional illustration of an embodiment of the storage participation controller 21. In accordance with this embodiment, first the power sharing ratio is calculated based on own and received storage capabilities. Then, the power sharing ratio is adjusted based on any fault messages, e.g. with information of deactivation, limit hitting or failure of any other power storage. Then, the adjusted power sharing ratio is cross-checked with corresponding power sharing ratios received from the other energy storages, and if necessary adjusted to be brought into line with these to obtain a final power sharing ratio which is stored and used to control current injection, and broadcasted to the other energy storages.

Figure 9:
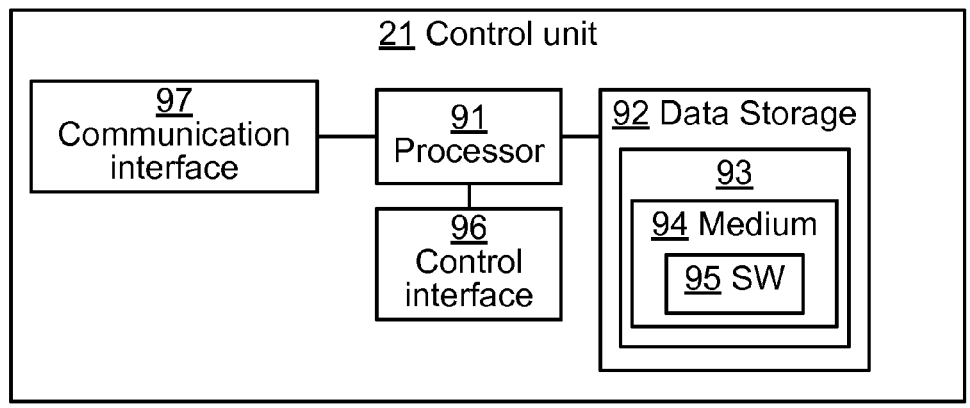
FIG. 9 is a schematic component block diagram of an embodiment of the control unit of the present invention.

FIG. 9 illustrates an embodiment of a control unit, e.g. the participation controller 21 or storage controller 3 discussed herein. The control unit 21 comprises processor circuitry 91 e.g. a central processing unit (CPU). The processor circuitry 91 may comprise one or a plurality of processing units in the form of microprocessor(s). However, other suitable devices with computing capabilities could be comprised in the processor circuitry 91, e.g. an application specific integrated circuit (ASIC), a field programmable gate array (FPGA) or a complex programmable logic device (CPLD). The processor circuitry 91 is configured to run one or several computer program(s) or software (SW) 95 stored on a storage medium 94 of a computer program product 93 in a data storage 92 of one or several storage unit(s) e.g. a memory. The storage unit comprises a computer readable means 94 as discussed herein and may e.g. be in the form of a Random Access Memory (RAM), a Flash memory or other solid state memory, or a hard disk, or be a combination thereof. The processor circuitry 91 may also be configured to store data in the storage 92, as needed. The control unit 21 also comprises a control interface 96 for sending control signals for control of the energy storage 2, e.g. to the primary control 22. Further, the control unit 21 comprises a communication interface 97 for transmitting and receiving information signals from corresponding control units of other energy storages in the microgrid 1.

Figure 10:
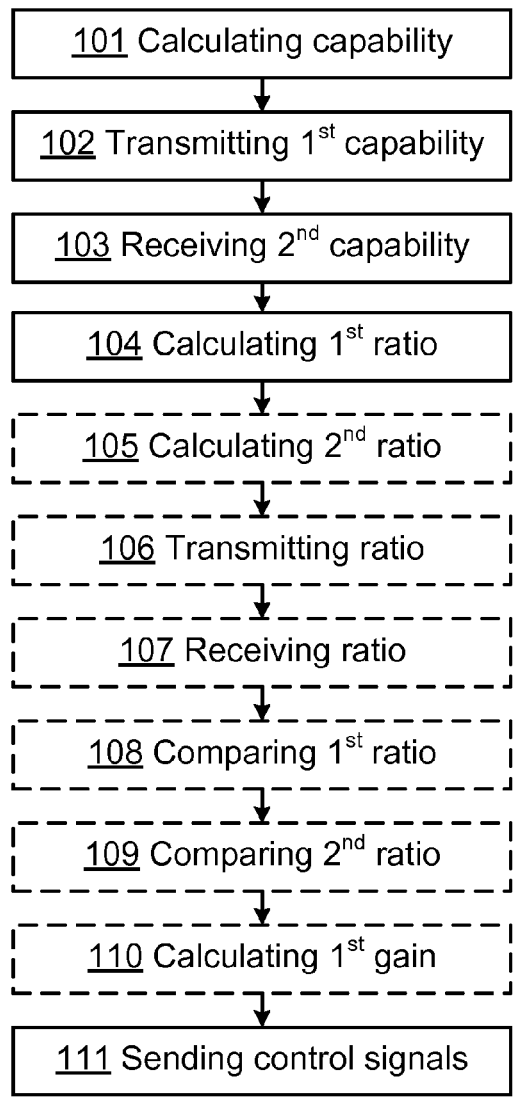
FIG. 10 is a schematic flow chart of embodiments of the method of the present invention.

FIG. 10 illustrates embodiments of the method of the present invention. The method is performed by a first control unit 21 (or possibly 3) for controlling a first energy storage 2 in a microgrid 1. The control unit 21 calculates 101 a first storage capability parameter for the first energy storage 2. Capability information about the calculated 101 first storage capability parameter is transmitted 102 to at least a second control unit 21 or 3 configured for controlling a second energy storage 2 in the microgrid 1. Before, after or during the calculating 101 and transmitting 102, capability information about a second storage capability parameter for the second energy storage is received 103 from the second control unit. Then, a first power sharing ratio for the first energy storage 2 is calculated 104 based on the calculated 101 first and received 103 second storage capabilities. Finally, control signals comprising information (e.g. gains) based on the calculated 104 first power sharing ratio are sent 111 (e.g. to a primary control 22 or directly to the converter 23), for controlling said first energy storage 2 to inject an amount of power P1 into the microgrid 1 in accordance with the first power sharing ratio for correcting an observed deviation Δf and/or ΔV in the microgrid 1.

In some embodiments of the present invention, also ratio information about the first power sharing ratio is transmitted 106 to the at least second control unit. And, correspondingly, ratio information comprising information about a second power sharing ratio for the second energy storage, as calculated by the second control unit, is received 107 from the second control unit. Optionally, a second power sharing ratio for the second energy storage, based on the first and second storage capabilities, has also been calculated 105, whereby the transmitted 106 ratio information may also comprises information about the second power sharing ratio, allowing the second control unit to compare it with its own calculations. Optionally, the first control unit 21 compares 109 the second power sharing ratio from the second control unit with the second power sharing ratio calculated 104 by the first control unit, before sending 111 the control signals.

In some embodiments of the present invention the received 107 ratio information further comprises information about the first power sharing ratio as calculated by the second control unit 21, whereby the method may further comprise comparing 108 the received 107 information about the first power sharing ratio with the first power sharing ratio calculated 104 by the first control unit 21, before sending 111 the control signals.

In some embodiments of the present invention, a first power sharing gain m1 (or possibly m1limit) is calculated 110 by the first control unit 21 based on the first power sharing ratio, whereby the sent 111 control signal information based on the calculated 104 first power sharing ratio may also comprise information about said first power sharing gain m1.

In some embodiments of the present invention, the calculating 101 a first storage capability parameter is based on available energy in the first energy storage 2, a power rating of the first energy storage 2, a current limit of the first energy storage 1, and/or a charge/discharge rate limit of the first energy storage 2.

Below follows another aspect of the present invention.

According to an aspect of the present invention, there is provided a first control unit 21 for controlling a first energy storage 2 in a microgrid 1. The control unit comprises means (e.g. the processor circuitry 91) for calculating 101 a first storage capability parameter for the first energy storage 2. The control unit also comprises means (e.g. the processor circuitry 91 in cooperation with the communication interface 97) for transmitting 102 capability information about the first storage capability parameter to at least a second control unit 21 configured for controlling a second energy storage 2 in the microgrid. The control unit also comprises means (e.g. the processor circuitry 91 in cooperation with the communication interface 97) for receiving 103 capability information about a second storage capability parameter for the second energy storage 2 from the second control unit 21. The control unit also comprises means (e.g. the processor circuitry 91) for calculating 104 a first power sharing ratio for the first energy storage 2, based on the first and second storage capabilities. The control unit also comprises means (e.g. the processor circuitry 91 in cooperation with the control interface 96) for sending 111 control signals comprising information based on the calculated first power sharing ratio, for controlling said first energy storage 2 to inject an amount of power P1 into the microgrid 1 in accordance with the first power sharing ratio for correcting an observed deviation Δf and/or ΔV in the microgrid.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A decentralised control method performed by a first control unit for controlling a first energy storage in an electrical power microgrid comprising a plurality of energy storages each comprising a respective control unit, the method comprising:
   calculating a first storage capability parameter for the first energy storage of the plurality of energy storages;
   transmitting capability information about the first storage capability parameter to at least a second control unit configured for controlling a second energy storage of the plurality of energy storages;
   receiving capability information about a second storage capability parameter for the second energy storage from the second control unit;
   calculating a first power sharing ratio for the first energy storage, based on the first and second storage capabilities;
   receiving, from the second control unit, ratio information comprising information about a second power sharing ratio for the second energy storage, as calculated by the second control unit;
   adjusting the calculated first power sharing ratio based on the received information about the second power sharing ratio; and
   sending control signals comprising information based on the calculated first power sharing ratio, for controlling said first energy storage to inject an amount of power into the microgrid in accordance with the first power sharing ratio for correcting an observed deviation in the microgrid.

2. The method of claim 1, further comprising:
   transmitting ratio information about the first power sharing ratio to the at least second control unit.

3. The method of claim 2, further comprising:
   calculating a second power sharing ratio for the second energy storage, based on the first and second storage capabilities;
   wherein the transmitted ratio information also comprises information about the second power sharing ratio.

4. The method of claim 3, further comprising:
   comparing the second power sharing ratio from the second control unit with the second power sharing ratio calculated by the first control unit, and adjusting the calculated second power sharing ratio based on the second power sharing ratio from the second control unit, before sending the control signals.

5. The method of claim 1, wherein the received ratio information further comprises information about the first power sharing ratio as calculated by the second control unit, the method further comprising:
comparing the received information about the first power sharing ratio with the first power sharing ratio calculated by the first control unit, and adjusting the calculated first power sharing ratio based on the first power sharing ratio from the second control unit, before sending the control signals.

6. The method of claim 1, further comprising:
calculating a first power sharing gain based on the first power sharing ratio;
wherein the sent control signal information based on the calculated first power sharing ratio comprises information about said first power sharing gain.

7. The method of claim 1, wherein the calculating a first storage capability parameter is based on available energy in the first energy storage, power rating of the first energy storage, current limit of the first energy storage, and/or charge/discharge rate limit of the first energy storage.

8. A computer program product comprising computer-executable components for causing a control unit to perform the method of claim 1 when the computer-executable components are run on processor circuitry comprised in the control unit.

9. A first control unit for decentralised control of a first energy storage in an electrical power microgrid comprising a plurality of energy storages each comprising a respective control unit, the control unit comprising:
a processor circuitry; and
a data storage unit storing instructions executable by said processor circuitry whereby said control unit is operative to:
calculate a first storage capability parameter for the first energy storage of the plurality of energy storages;
transmit capability information about the first storage capability parameter to at least a second control unit configured for controlling a second energy storage of the plurality of energy storages;
receive capability information about a second storage capability parameter for the second energy storage from the second control unit;
calculate a first power sharing ratio for the first energy storage, based on the first and second storage capabilities;
receive, from the second control unit, ratio information comprising information about a second power sharing ratio for the second energy storage, as calculated by the second control unit;
adjust the calculated first power sharing ratio based on the received information about the second power sharing ratio; and
send control signals comprising information based on the calculated first power sharing ratio, for controlling said first energy storage to inject an amount of power into the microgrid in accordance with the first power sharing ratio for correcting an observed deviation ($\Delta f$; $\Delta V$) in the microgrid.

10. An energy storage for a microgrid, the energy storage comprising:
an energy storing device, e.g. a battery or a flywheel; and
a storage controller comprising a control unit including:
a proccessor circuitry; and
a data storage unit storing instructions executable by said processor circuitry whereby said control unit is operative to:
calculate a first storage capability parameter for the first energy storage of the plurality of energy storages;
transmit capability information about the first storage capability parameter to at least a second control unit configured for controlling a second energy storage of the plurality of energy storages;
receive capability information about a second storage capability parameter for the second energy storage from the second control unit;
calculate a first power sharing ratio for the first energy storage, based on the first and second storage capabilities;
receive, from the second control unit, ratio information comprising information about a second power sharing ratio for the second energy storage, as calculated by the second control unit;
adjust the calculated first power sharing ratio based on the received information about the second power sharing ratio; and
send control signals comprising information based on the calculated first power sharing ratio, for controlling said first energy storage to inject an amount of power into the microgrid in accordance with the first power sharing ratio for correcting an observed deviation ($\Delta f$; $\Delta V$) in the microgrid.

11. A microgrid comprising:
at least one distributed generator, DG; and
a plurality of energy storages including:
an energy storing device, e.g. a battery or a flywheel; and
a storage controller comprising a control unit including:
a proccessor circuitry; and
a data storage unit storing instructions executable by said processor circuitry whereby said control unit is operative to:
calculate a first storage capability parameter for the first energy storage of the plurality of energy storages;
transmit capability information about the first storage capability parameter to at least a second control unit configured for controlling a second energy storage of the plurality of energy storages;
receive capability information about a second storage capability parameter for the second energy storage from the second control unit;
calculate a first power sharing ratio for the first energy storage, based on the first and second storage capabilities;
receive, from the second control unit, ratio information comprising information about a second power sharing ratio for the second energy storage, as calculated by the second control unit;
adjust the calculated first power sharing ratio based on the received information about the second power sharing ratio; and
send control signals comprising information based on the calculated first power sharing ratio, for controlling said first energy storage to inject an amount of power into the microgrid in accordance with the first power sharing ratio for correcting an observed deviation ($\Delta f$; $\Delta V$) in the microgrid.

12. A computer program for decentralised control of a first energy storage in an electrical power microgrid comprising a plurality of energy storages each comprising a respective control unit, the computer program comprising computer program code which is able to, when run on processor circuitry of the control unit of the first energy storage, cause the control unit to:
- calculate a first storage capability parameter for the first energy storage of the plurality of energy storages;
- transmit capability information about the first storage capability parameter to at least a second control unit configured for controlling a second energy storage of the plurality of energy storages;
- receive capability information about a second storage capability parameter for the second energy storage from the second control unit;
- calculate a first power sharing ratio for the first energy storage, based on the first and second storage capabilities;
- receive, from the second control unit, ratio information comprising information about a second power sharing ratio for the second energy storage, as calculated by the second control unit;
- adjust the calculated first power sharing ratio based on the received information about the second power sharing ratio; and
- send control signals comprising information based on the calculated first power sharing ratio, for controlling said first energy storage to inject an amount of power into the microgrid in accordance with the first power sharing ratio for correcting an observed deviation ($\Delta f$; $\Delta V$) in the microgrid.

13. A computer program product comprising a computer program according to claim 12 and a computer readable means on which the computer program is stored.

* * * * *